(12) United States Patent
Hamashima

(10) Patent No.: US 11,821,764 B2
(45) Date of Patent: Nov. 21, 2023

(54) POSITION DETECTING MEMBER

(71) Applicant: KYOCERA CORPORATION, Kyoto (JP)

(72) Inventor: Hiroshi Hamashima, Hikone (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/998,077

(22) PCT Filed: May 7, 2021

(86) PCT No.: PCT/JP2021/017555
§ 371 (c)(1),
(2) Date: Nov. 7, 2022

(87) PCT Pub. No.: WO2021/230161
PCT Pub. Date: Nov. 18, 2021

(65) Prior Publication Data
US 2023/0175873 A1    Jun. 8, 2023

(30) Foreign Application Priority Data
May 9, 2020 (JP) .................................. 2020-082895

(51) Int. Cl.
*G01D 5/34* (2006.01)
*G01D 5/347* (2006.01)

(52) U.S. Cl.
CPC ..... *G01D 5/34707* (2013.01); *G01D 5/34746* (2013.01)

(58) Field of Classification Search
CPC .. G01D 5/347; G01D 5/34707; G01D 5/3473; G01D 5/34746; G01D 5/34761
See application file for complete search history.

(56) References Cited

U.S. PATENT DOCUMENTS

2009/0040504 A1\* 2/2009 Muneishi ............... G01D 5/363
356/28
2009/0267803 A1\* 10/2009 Tominaga .......... G01D 5/34707
250/237 G
2015/0090868 A1    4/2015 Suzuishi et al.

FOREIGN PATENT DOCUMENTS

JP    2019-113449 A    7/2019

\* cited by examiner

*Primary Examiner* — Kevin K Pyo
(74) *Attorney, Agent, or Firm* — Procopio, Cory, Hargreaves & Savitch LLP

(57) ABSTRACT

A position detecting member includes a base portion including a light-receiving surface having a black color tone and a back surface located on an opposite side to the light-receiving surface. A surface layer portion including at least the base portion is made of ceramic. An average value of root mean square slopes (RΔq) on the light-receiving surface in a roughness curve is larger than an average value of root mean square slope (RΔq) on the back surface.

9 Claims, 3 Drawing Sheets

POSITION DETECTING MEMBER

TECHNICAL FIELD

The present invention relates to a position detecting member.

BACKGROUND OF INVENTION

A device for detecting a position to be detected by an optical sensor has been used. Patent Document 1 proposes a position detector as a device for reducing an error in position detection. As illustrated in FIG. 3, the position detector includes: two optical sensors 151A and 151B each including a light-emitting portion 1511 and a light-receiving portion 1512, the light-receiving portion 1512 being capable of photoelectric conversion; a scale portion 1522 including two regions having different reflectance and being capable of relatively moving with respect to the optical sensors 151A and 151B; a base member 1523 holding the scale portion 1522; positioning portions PA1, HA1, PA2, and HA2 configured to position the scale portion 1522 with respect to the base member 1523; and a detection means 151 configured to detect relative positions between the scale portion 1522 and each of the optical sensors 151A and 151B based on a difference between signal voltages output from the optical sensors 151A and 151B. The regions of the scale portion 1522 having different reflectance include a member having low reflectance and a member having high reflectance.

A low-reflection scale 1521 made of a resin coated in black is exemplified as the low-reflectance member, and a high-reflection scale 1522 made of a resin coated in white is exemplified as the high-reflectance member.

The low-reflection scale 1521 and the high-reflection scale 1522 are disposed on the base member 1523, and their positions with respect to each other are defined by the positioning pins PA1 and PA2 provided on the base member 1523 and having a substantially cylindrical shape.

The low-reflection scale 1521 includes opening portions KA and KB, and the high-reflection scale 1522 is exposed through the opening portions KA and KB. The optical sensors 151A and 151B are located substantially directly above edges EA and EB of the opening portions KA and KB, respectively. The edges EA and EB are boundary lines between a low-reflective region in black color and a high-reflective region in white color, and are continuous in a straight line.

The edges EA and EB are formed at angles θ and −θ, respectively, with respect to an X direction. Thus, a position of a point on each of the edges EA and EB changes also in a Y direction by an amount corresponding to a respective one of the angles θ or −θ in accordance with change in the position in the X direction.

CITATION LIST

Patent Literature

Patent Document 1: JP 2019-113449 A

SUMMARY

In an embodiment of the present disclosure, a position detecting member includes a base portion including a light-receiving surface having a black color tone and a back surface located on an opposite side to the light-receiving surface. A surface layer portion including at least the base portion is made of ceramic. An average value of root mean square slopes (RΔq) on the light-receiving surface in a roughness curve is larger than an average value of root mean square slopes (RΔq) on the back surface.

DESCRIPTION OF EMBODIMENTS

Hereinafter, an example of a position detecting member of a present disclosure will be described in detail with reference to the drawings.

Figure 1A:
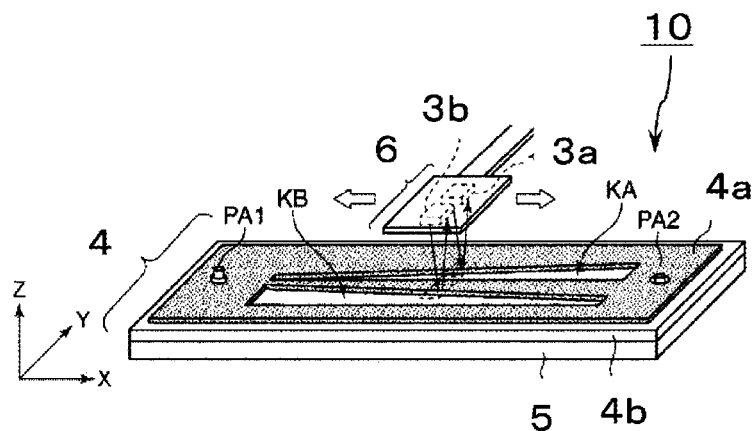
FIG. 1A is a perspective view illustrating an example of a schematic configuration of a position detector using a position detecting member of the present disclosure.
Figure 1B:
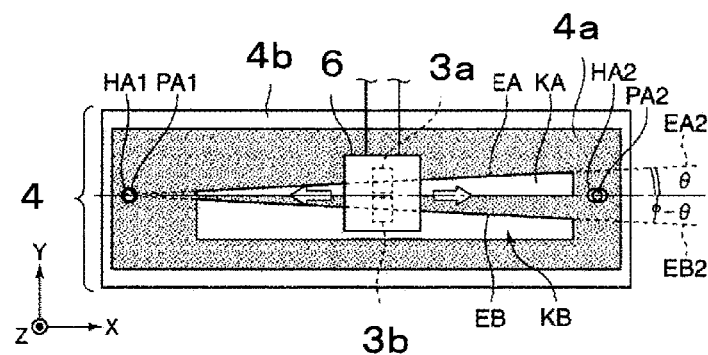
FIG. 1B is a plan view of the position detector.
Figure 1C:
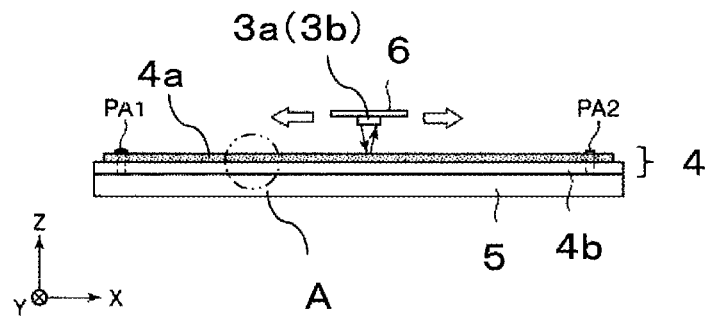
FIG. 1C is a side view of the position detector.
Figure 1D:
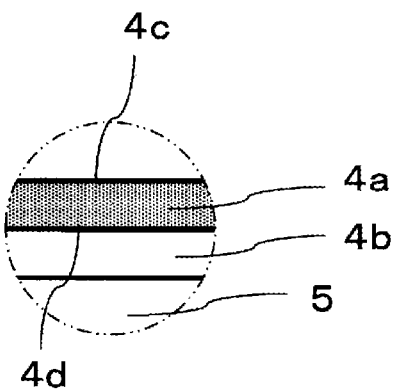
FIG. 1D is an enlarged side view of a part A in FIG. 1C.

FIGS. 1A to 1D illustrate an example of a schematic configuration of a position detector using the position detecting member of the present disclosure. FIG. 1A is a perspective view, FIG. 1B is a plan view, FIG. 1C is a side view, and FIG. 1D is an enlarged side view of a part A in FIG. 1C.

Figure 2A:
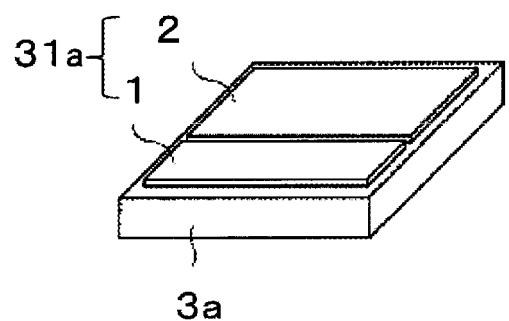
FIG. 2A is a perspective view illustrating an example of an optical sensor used in the position detector illustrated in FIG. 1.
Figure 2B:
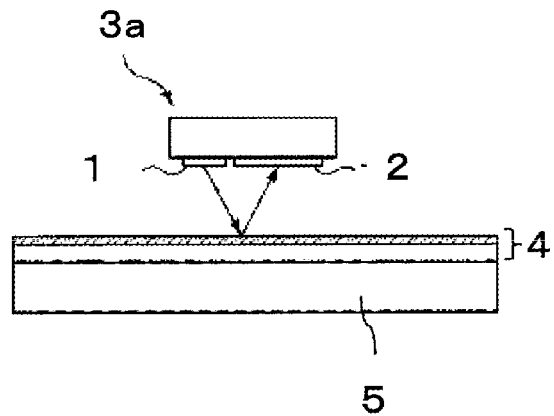
FIG. 2B is a side view illustrating a relationship between the optical sensor illustrated in FIG. 2A and a scale portion.
Figure 3A:
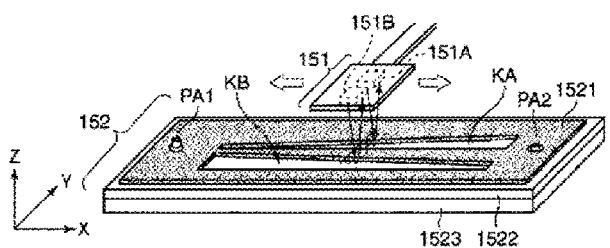
FIG. 3A is a perspective view illustrating an example of a schematic configuration of a known position detector.
Figure 3B:
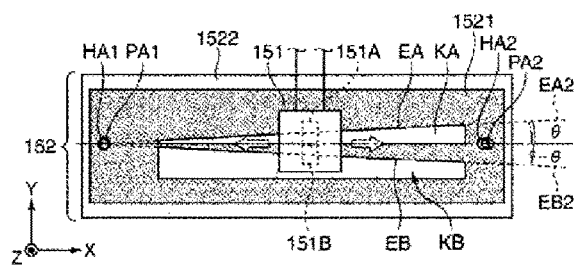
FIG. 3B is a plan view of the known position detector.
Figure 3C:
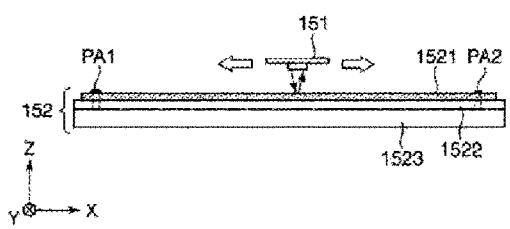
FIG. 3C is a side view of the known position detector.
Figure 3D:
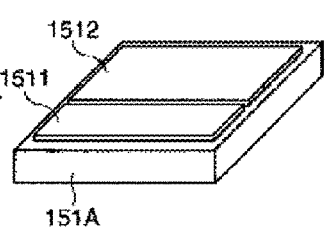
FIG. 3D is a perspective view illustrating an example of an optical sensor used in the known position detector illustrated in FIGS. 3A to 3C.
Figure 3E:
FIG. 3E is a side view illustrating a relationship between the optical sensor illustrated in FIG. 3D and a scale portion.

FIGS. 2A and 2B illustrate an example of an optical sensor used in the position detector illustrated in FIGS. 1A to 1D. FIG. 2A is a perspective view, and FIG. 2B is a side view illustrating a relationship between the optical sensor and a scale portion illustrated in FIG. 2A.

A position detector 10 illustrated in FIG. 1 is a device for detecting a position of a focus lens (not illustrated) that moves along an optical axis in an imaging device such as a camera.

The position detector 10 includes: two optical sensors 3a and 3b each including a light-emitting portion 1 and a light-receiving portion 2, the light-receiving portion 2 being capable of photoelectric conversion; a scale portion 4 including two regions having different reflectance and being capable of relatively moving with respect to the optical sensors 3a and 3b; a base member 5 holding the scale portion 4; positioning portions (a first positioning pin PA1, a first positioning hole HA1, a second positioning pin PA2, and a second positioning hole HA2) configured to position the scale portion 4 with respect to the base member 5, and a detection means 6 configured to detect relative positions between the scale portion 4 and each of the optical sensors 3a and 3b based on a difference between signal voltages output from the optical sensors 3a and 3b. The regions having different reflectance of the scale portion 4 include a low-reflective member 4a indicating a low reflectance and a high-reflective member 4b indicating a high reflectance, with respect to light emitted from the light-emitting portion 1. For example, the low-reflective member 4a exhibits a black-based tone and the high-reflective member 4b exhibits a white-based tone.

The optical sensors 3a and 3b move in the X direction in FIG. 1A with respect to the scale portion 4, and scan the scale portion 4 to obtain relative position information with respect to the scale portion 4. The optical sensor 3a includes a photoreflector 31a. The optical sensor 3b also includes the photoreflector.

The photoreflector 31a includes the light-emitting portion 1 including an LED, and the light-receiving portion 2 including a photodiode. As illustrated in FIG. 2B, the light emitted from the light-emitting portion 1 is incident on the scale portion 4 disposed facing the light-emitting portion 1 and reflected, and the light-receiving portion 2 receives the reflected light, and thus charge is generated by photoelectric conversion, and intensity of the reflected light is measured as a signal voltage.

The low-reflective member 4a includes the opening portions KA and KB, and the high-reflective member 4b is exposed through the opening portions KA and KB. The optical sensors 3a and 3b are located above the edges EA and EB of the opening portions KA and KB, respectively. The edges EA and EB are boundary lines between a low-reflective region in black color and a high-reflective region in white color, and are continuous in a straight line.

The edges EA and EB are formed at angles θ and −θ, respectively, with respect to an X direction. Thus, a position of a point on each of the edges EA and EB changes also in a Y direction by an amount corresponding to a respective one of the angles θ or −θ in accordance with change in the position in the X direction.

The position detecting member of the present disclosure is, for example, the low-reflective member 4a described above, and includes a base portion including a light-receiving surface 4c having a black color tone and a back surface 4d located on an opposite side to the light-receiving surface 4c, and a surface layer portion including at least the base portion is made of ceramic, and an average value of root mean square slopes (RΔq) on the light-receiving surface 4c in a roughness curve is larger than an average value of root mean square slopes (RΔq) on the back surface 4d.

The root mean square slope (RΔq) in the roughness curve is the root mean square of a local slope dZ/dx at a reference length 1 of the roughness curve, measured in accordance with JIS B 0601:2001, and is defined by the following equation:

$$R\Delta q = \sqrt{\frac{1}{\ell}\int_0^\ell \left(\frac{d}{dx}Z(x)\right)^2 dx}.$$

Equation (1)

When the value of the root mean square slope (RΔq) is large, the unevenness of the surface is steep, and when the value of the root mean square slope (RΔq) is small, the unevenness of the surface is gentle.

When the average value of the root mean square slopes (RΔq) is larger on the light-receiving surface 4c than on the back surface 4d, the reflectance of the light-receiving surface 4c decreases, and thus the contrast with respect to the low-reflective member 4a increases. At the same time, the average value of the root mean square slopes (RΔq) is smaller on the back surface 4d than on the light-receiving surface 4c, and thus when the high-reflective member 4b is fixed to the low-reflective member 4a with the positioning member such as the first positioning pin PA1, and the second positioning pin PA2, shedding from the back surface 4d is reduced, and thus possibility that shedding particles become floating particles and obstruct the optical path is suppressed.

The average value of the root mean square slopes (RΔq) on the light-receiving surface 4c is preferably 0.4 or less. When the average value of the root mean square slopes (RΔq) on the light-receiving surface 4c is within this range, irregular reflection is unlikely to occur even when the light emitted from the light-emitting portion 1 is incident on the light-receiving surface 4c, and thus erroneous recognition by the light-receiving portion 2 is suppressed.

In particular, a difference between the average value of the root mean square slopes (RΔq) on the back surface 4d and the average value of the root mean square slopes (RΔq) on the light-receiving surface 4c is preferably 0.1 or more.

Here, the surface layer portion in the present disclosure refers to a region within 30% in a depth direction from the light-receiving surface 4c with the thickness of the base portion being 100%.

An average value of cutting level differences (Rδc) on the light-receiving surface 4c may be larger than an average value of cutting level differences (Rδc) on the back surface 4d, where Rδc indicates a difference between the cutting level at a load length ratio of 25% in the roughness curve and the cutting level at a load length ratio of 75%.

When the average value of the cutting level differences (Rδc) is larger on the light-receiving surface 4c is larger than the average value of cutting level differences (Rδc) on the back surface 4d, the reflectance of the light-receiving surface 4c further decreases, and thus the contrast with respect to the low-reflective member 4a further increases. At the same time, the average value of the cutting level differences (Rδc) on the back surface 4d is smaller than the average value of cutting level differences (Rδk) on the light-receiving surface 4c, and thus when the high-reflective member 4b is fixed to the low-reflective member 4a with the positioning member, shedding from the back surface 4d is reduced, and thus possibility that shedding particles become floating particles and obstruct the optical path is further suppressed.

In particular, the average value of the cutting level differences (Rδc) on the light-receiving surface 4c is preferably 8.8 μm or less. When the average value of the cutting level differences (Rδk) on the light-receiving surface 4c is within this range, irregular reflection is unlikely to occur even when the light emitted from the light-emitting portion 1 is incident on the light-receiving surface 4c, and thus erroneous recognition by the light-receiving portion 2 is suppressed. In particular, a difference between the average value of the cutting level differences (Rδk) on the back surface 4d and the average value of the cutting level differences (Rδc) on the light-receiving surface 4c may be 3 μm or more.

The root mean square slopes (RΔq) and the section height differences (Rδc) can be measured in accordance with JIS B 0601:2001 using a shape analysis laser microscope (available from Keyence Corporation, VK-X1100 or a successor model thereof). As the measurement conditions, first, an illumination system is employed with an epi-illumination system, a magnification is set to 240 times, a cutoff value λs is set to 25 μm, a cutoff value λc is set to 0.8 mm, a cutoff value λf is not set, a termination effect correction is set ON, and a measurement range for one point from the light-receiving surface 4c and the back surface 4d that are to be measured is set to, for example, 1420 μm×1070 μm. Then, four lines are drawn at substantially equal intervals along the longitudinal direction of each measurement range, and a linear roughness measurement may be performed for a total of eight lines on the measurement range of two locations for each of the surfaces. The length to be measured is, for example, 1320 µm for each line. Then, the root mean square slope (RΔq) and the cutting level difference (Rδk) of each line are determined, and an average RΔq value and an average Rδc value may be calculated.

In the light-receiving surface $4c$, the lightness index $L^*$ in CIE 1976 $L^*a^*b^*$ color space may be 48 or less, the psychometric chroma coordinate $a^*$ may be −3 or more and 3 or less, and the psychometric chroma coordinate $b^*$ may be −3 or more and 3 or less.

When the lightness index $L^*$ is 48 or less, the psychometric chroma coordinate $a^*$ is −3 or more and 3 or less, and the psychometric chroma coordinate $b^*$ is within the above-described range, the color becomes extreme black or a color close thereto, and thus the aesthetic quality is increased, and the product value is improved.

The color difference $\Delta E^*ab$ representing the variation in the color tone of the light-receiving surface $4c$ is preferably 1.5 or less. When the color difference $\Delta E^*ab$ is 1.5 or less, the variation in the color tone of the light-receiving surface $4c$ decreases, and thus irregular reflection is unlikely to occur, and the product value is also improved. The value of lightness index $L^*$ and the psychometric chroma coordinates $a^*$ and $b^*$ can be determined in accordance with JIS Z 8722:2009. For example, a spectral color difference meter (NF 777, manufactured by Nippon Denshoku Industries Co., Ltd., or its successor) may be used, and as the measurement conditions, a luminous source may be set to the CIE standard luminous source D65 and the viewing angle may be set to 2°.

The color difference $\Delta E^*ab$ is represented by Equation (A), and is a numerical value indicating the difference in color between two points to be measured in the CIE 1976 $L^*a^*b^*$ color space. The two points in the present disclosure may be, for example, a specified point $P_0$ of the light-receiving surface $4c$, and any points $P_1$ to $P_7$ other than the specified point, and a maximum value of the color difference $\Delta E^*ab$ may be set to a target.

$$\Delta E^*ab = ((\Delta L^*)^2 + (\Delta a^*)^2 + (\Delta b^*)^2)^{1/2} \quad (A)$$

($\Delta L^*$: difference in the lightness index $L^*$ between the two points,
$\Delta a^*$: difference in the psychometric chroma coordinate $a^*$ between the two points,
$\Delta b^*$: difference in the psychometric chroma coordinate $b^*$ between the two points)

Note that when an area of the light-receiving surface $4c$ is small, such as four times or less than an area of a measurement portion of the spectral color difference meter, one point may be set to be a counterpart for $P_0$ instead of setting a plurality of points to be counterparts for $P_0$.

The reflectance of the light-receiving surface $4c$ in a wavelength range from 400 nm to 700 nm may be 17.4% or less. When the reflectance of the light-receiving surface $4c$ is 17.4% or less, absorption of light increases, and thus even when the position detecting member is installed in a predetermined position in a decompressed airtight space and the light-receiving surface $4c$ is irradiated with a light beam, the temperature increase of the airtight space around the light-receiving surface $4c$ can be suppressed.

The reflectance of the light-receiving surface $4c$ preferably gradually decrease linearly or exponentially from 400 nm to 700 nm in a wavelength range.

When the reflectance of the light-receiving surface $4c$ gradually decreases linearly or exponentially, the absorption of light in the infrared region and the visible light region close to the infrared region increases, and thus the temperature increase around the light-receiving surface $4c$ can be suppressed.

Here, in a case where the approximation function (exponential function, linear function, or the like) of the reflectance is set, the measurement may be performed with the interval of a wavelength being set to 10 nm in the above-described wavelength range.

The approximation function (the exponential function, the linear function, or the like) indicating the gradual decrease of the reflectance is set by using a graph tool included in Excel (trade name, Microsoft Corporation), and then, a correlation coefficient R is calculated. Next, the correlation coefficient R is tested at a significance level of 5% (two-sided probability) by using an r table (correlation coefficient test table), and if the result is significant, the approximation function (exponential function, linear function, or the like) indicating the gradual decrease in the reflectance is determined.

The reflectance of the light-receiving surface $4c$ in a wavelength range from 400 nm to 700 nm may be lower than the reflectance of the back surface $4d$.

In this case, heat is easily transferred from the light-receiving surface $4c$ side toward the back surface $4d$ side, and can be rapidly dissipated from the back surface $4d$.

Also in the measurement of the reflectance, the spectral color difference meter (NF 777, manufactured by Nippon Denshoku Industries Co., Ltd., or its successor) may be used, and as the measurement conditions, the luminous source may be set to the CIE standard luminous source D65 and the viewing angle may be set to 2°.

The surface layer portion including at least the light-receiving surface $4c$ is preferably composed of a composite ceramic containing aluminum oxide as a main component and carbides, carbonitrides, nitrides or borides of titanium as a subcomponent, or a ceramic containing silicon carbide or boron carbide as a main component.

Since both of these ceramics have low volume resistivity, charging can be suppressed and static electricity can be rapidly removed.

The position detecting member described above has the base portion with a flat plate shape, but may have the base portion with a shape other than this shape, such as a columnar or a cylindrical protruding portion for being positioned on the back surface $4d$ side of the base portion.

In the present disclosure, the main component means a component that accounts for 60 mass % or more among the total of 100 mass % of the components constituting the ceramic, and the main component for other than the composite ceramic preferably accounts for 90 mass % or more. When the surface layer portion is composed of ceramic containing silicon carbide as a main component, boron and free carbon may be contained as other components.

When the surface layer portion is composed of the composite ceramic described above, the main component accounts for 60 mass % or more and 70 mass % or less, and the sub component accounts for 30 mass % or more and 40 mass % or less, and the other minor components may be contained in a total of 1 mass %.

The components can be identified by an X-ray diffractometer using a CuKα beam, and the content of each of the components can be determined, for example, with an inductively coupled plasma (ICP) emission spectrophotometer or a fluorescence X-ray spectrometer.

Next, an example of a manufacturing method of the position detecting member of the present disclosure will be described.

A case will be described in which the position detecting member of the present disclosure is made of the ceramic containing silicon carbide as the main component.

First, a coarse-grained powder and a fine-grained powder are prepared as a silicon carbide powder, and are ground and mixed with water and, as necessary, a dispersing agent, for 40 to 60 hours by using a ball mill or a bead mill to form a slurry. Here, the particle size of the fine-grained powder after being ground and mixed is equal to or larger than 0.4 µm and equal to or less than 4 µm, and the particle size of the coarse-grained powder after being ground and mixed is equal to or larger than 11 µm and equal to or less than 34 µm.

Next, the yielded slurry is added and mixed with a sintering aid made of a boron carbide powder and an amorphous carbon powder or a phenol resin, and a binder, and then, spray drying is performed to yield granules consisting mainly of silicon carbide. The amorphous carbon powder or the phenol resin is a carbon source. If necessary, a graphite powder and a dispersant for dispersing the graphite powder (hereinafter referred to as a graphite dispersant) may also be added and mixed together.

Here, the added amount of the boron carbide powder, which is a sintering aid, is, for example, 0.2 parts by mass or more and 2.8 parts by mass or less with respect to 100 parts by mass of the silicon carbide powder, and the added amount of the carbon source is, for example, 0.3 parts by mass or more and 20 parts by mass or less with respect to 100 parts by mass of the silicon carbide powder.

In order to produce the position detecting member including the light-receiving surface in which the lightness index L* in CIE 1976 L*a*b* color space is 48 or less, the psychometric chroma coordinate a* is −3 or more and 3 or less, and the psychometric chroma coordinate b* is −3 or more and 3 or less, the added amount of the boron carbide powder may be, for example, 1.02 parts by mass or more and 2.8 parts by mass or less.

Note that as for the mass ratios of the fine-grained powder and the coarse-grained powder, for example, the mass ratio of the fine-grained powder is equal to or larger than 85 mass % and equal to or less than 94 mass %, and the mass ratio of the coarse-grained powder is equal to or larger than 6 mass % and equal to or less than 15 mass %. In order to set the content of graphite contained in the position detecting member to 10 mass % or less, the total of the addition amount of the graphite powder and ½ of the addition amount of the carbon source may be set to 10 parts by mass or less with respect to 100 parts by mass of the silicon carbide powder.

By using a dispersing agent for graphite, the dispersing agent can be adsorbed onto the graphite powder that is hydrophobic, and thus, can wet and infiltrate the graphite powder into a slurry with water serving as a solvent, and since the dispersing agent acts so as to suppress aggregation of the graphite, homogeneous granules including the graphite therein can be produced. As the dispersing agent for graphite, anionic surfactants such as carboxylates such as sodium polycarboxylate, sulfonates, sulfate ester salts, and phosphate ester salts are preferably used. By adsorbing an anionic surfactant that is a dispersing agent for graphite onto the graphite powder, the graphite powder is easily wetted with and infiltrated into a slurry, and re-aggregation of the graphite powder is suppressed by charge repulsion of the hydrophilic group contained in the anionic surfactant, and thus the graphite powder can be sufficiently dispersed in the slurry without aggregation.

Next, the granules are filled into a powder compacting die and are pressed from a thickness direction at a pressure selected as appropriate within a range equal to or larger than 49 MPa and equal to or less than 147 MPa to yield a powder compact. The powder compact has a shape of a plate-like body such as a square plate and a circular plate, or a shape including a protruding portion on at least one main surface of the plate-like body.

Then, one main surface of the powder compact is subjected to blasting and the other main surface thereof is subjected to machining to yield a precursor in which the average value of the root mean square slopes (RΔq) in the roughness curve is larger in the main surface subjected to the blasting than in the main surface subjected to the machining.

A through-hole may be formed in the powder compact in the thickness direction by machining. The main surface subjected to the blasting is the light-receiving surface 4c of the position detecting member, and the main surface subjected to the machining is the back surface 4d of the position detecting member.

Here, abrasive grains used in the blasting include, for example, at least one of silica, Alundum (registered trade name, Saint-Gobain Abrasives, Inc.), white Alundum, emery, zircon, carborundum (registered trade name, Saint-Gobain Abrasives, Inc.), green carborundum, and garnet, and abrasive grains having a grain size number from F60 to F100 defined by JIS R 6001-2:2017 are used, and the blasting pressure of the abrasive grains is, for example, 0.1 MPa or more and 0.3 MPa or less.

Then, the precursor is degreased in a nitrogen atmosphere at a temperature of 450° C. or more and 650° C. or less for a holding time of 2 hours or more and 10 hours or less to yield a degreased body.

Next, the degreased body is held at a temperature of 1800° C. or more and 2200° C. or less for a period of time of 3 hours or more and 6 hours or less in a decompressed atmosphere of inert gas such as argon to yield the position detecting member of the present disclosure.

The position detecting member produced by the manufacturing method described above is less likely to be reduced in the accuracy of the position detecting, and thus can be continuously used over a long period of time, and the contrast of the low-reflectance member with respect to the high-reflectance member increases, and thus erroneous recognition can be reduced.

Although the position detecting member according to the embodiments of the present disclosure have been described above, the present disclosure is not limited to the above embodiments and various changes and variations can be made within the scope of the present disclosure.

For example, it may be used as a susceptor marker that detects a position of a substrate such as a wafer in a semiconductor manufacturing device.

REFERENCE SIGNS

1 Light-emitting portion
2 Light-receiving portion
3a, 3b Optical sensor
4 Scale portion
4a Low-reflective member
4b High-reflective member
4c Light-receiving surface
4d Back surface
5 Base member
6 Detection means

The invention claimed is:
1. A position detecting member comprising:
a base portion comprising a light-receiving surface having a black color tone; and
a back surface located on an opposite side to the light-receiving surface,
wherein
a surface layer portion comprising at least the base portion is made of ceramic, and
an average value of root mean square slopes (RΔq) on the light-receiving surface in a roughness curve is larger than an average value of root mean square slopes (RΔq) on the back surface.

2. The position detecting member according to claim 1, wherein
the average value of root mean square slopes (RΔq) on the light-receiving surface is 0.4 or less.

3. The position detecting member according to claim 1, wherein
an average value of cutting level differences (Rδk) on the light-receiving surface is larger than an average value of cutting level differences (Rδk) on the back surface, where Rδc indicates a difference between the cutting level at a load length ratio of 25% in the roughness curve and the cutting level at a load length ratio of 75%.

4. The position detecting member according to claim 3, wherein
the average value of cutting level differences (Rδc) on the light-receiving surface is 8.8 μm or less.

5. The position detecting member according to claim 1, wherein
in the light-receiving surface, the lightness index L* in CIE 1976 L*a*b* color space is 48 or less, the psychometric chroma coordinate a* is −3 or more and 3 or less, and the psychometric chroma coordinate b* is −3 or more and 3 or less.

6. The position detecting member according to claim 1, wherein
a color difference ΔE*ab in the light-receiving surface is 1.5 or less.

7. The position detecting member according to claim 1, wherein
reflectance of the light-receiving surface is 17.4% or less in a wavelength range from 400 nm to 700 nm.

8. The position detecting member according to claim 1, wherein
the reflectance of the light-receiving surface gradually decreases linearly or exponentially from 400 nm to 700 nm in a wavelength range.

9. The position detecting member according to claim 1, wherein
the surface layer portion is a region within 30% in a depth direction from the light-receiving surface with the thickness of the base portion being 100%.

* * * * *